Oct. 6, 1964  W. L. TRACY ETAL  3,151,488
ANGULAR ACCELEROMETER
Filed July 26, 1962  2 Sheets-Sheet 1
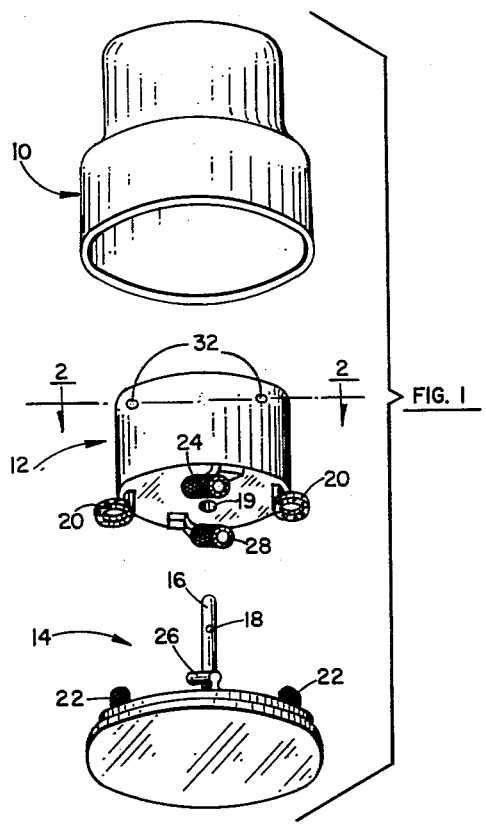
FIG. 1
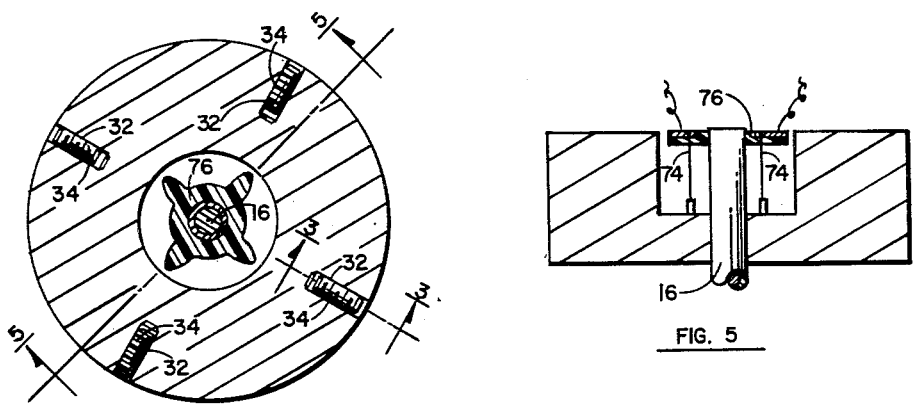
FIG. 2
FIG. 5
INVENTORS
WILLIAM L. TRACY
EDGAR B. ROMBERG
BY RICHARD B. HIGLEY
*Sidney Magnes*
AGENT

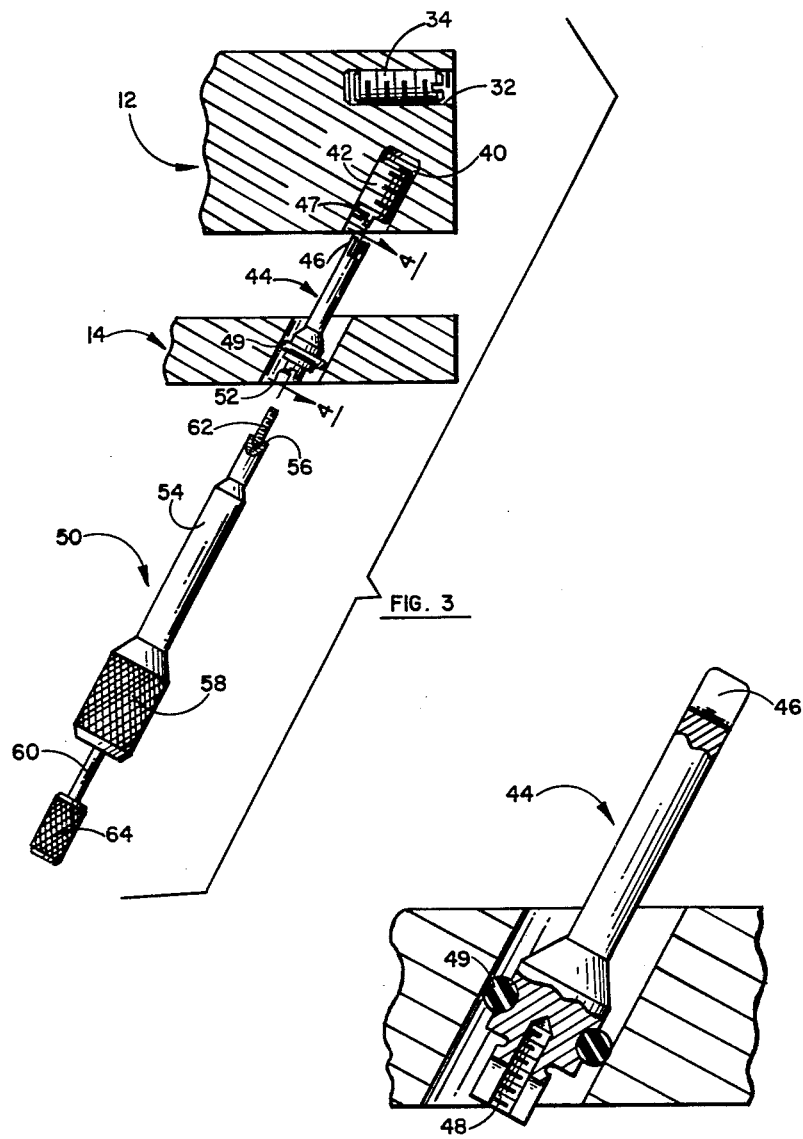

United States Patent Office

3,151,488
Patented Oct. 6, 1964

3,151,488
ANGULAR ACCELEROMETER
William L. Tracy, Edgar B. Romberg, and Richard B. Higley, Whittier, Calif., assignors to North American Aviation, Inc.
Filed July 26, 1962, Ser. No. 212,586
10 Claims. (Cl. 73—517)

This invention relates to an accelerometer; and more particularly to an accelerometer that measures twisting or "angular" motions of the vehicle to which it is attached, rather than "linear" or along-a-line motion of the vehicle.

*Background*

In the navigation of vehicles such as ships, aircraft, missiles, and the like, the concept of "inertial navigation" is becoming widely used. Inertial navigation is based on the characteristic that a body which has "inertia", tends to retain its original orientation. Thus, if suitable bodies, so-called "inertial masses," are associated with a vehicle, movements of the vehicle cause relative displacements between the vehicle and the inertial masses. These displacements can be sensed, and can be converted into values that indicate the movements of the vehicle.

When the vehicle accelerates in a forward direction, the inertial mass tends to lag behind; and this displacement between the vehicle and the inertial mass can be converted into information that is a measure of the vehicle's forward acceleration. Similarly, when the vehicle accelerates in a side-to-side, or up-or-down manner, the displacements with respect to selected inertial masses also indicate the acceleration of the vehicle in those particular directions. For obvious reasons, the inertial instruments that measure the above accelerations are known as "accelerometers".

The foregoing displacements and accelerations are known as "linear" (in-line) acceleration and displacements; because the vehicle is moving in a line—either forward, backward, to one side, or vertically.

A vehicle may undergo movements that are different from the linear movements described above. One such movement occurs, for example, when one wing of an airplane rises or falls, while the other wing moves in the opposite direction. This maneuver results in an angular movement known as "roll," and would not be measured directly by any of the linear accelerometers thus far discussed.

Another type of angular movement experienced by the vehicle occurs when the vehicle starts to climb or descend, because at such times the tail of the vehicle is either above or below the vehicle's nose. This type of angular vehicle movement is known as "pitch"; and again would not be measured directly by the linear accelerometers on the vehicle.

A third type of angular movement experienced by the vehicle is known as "yaw," and occurs when the nose veers off in one direction or the other; and, again, the linear accelerometers would not directly measure yawing motions.

Angular movements of the vehicle must be recognized, else the vehicle might be in a climb or in a turn when it is not desired to experience these motions. If these movements were not detected, the vehicle could unknowingly turn off course, and thus its actual position and altitude would be different from the desired one.

Angular movements such as those described above are best measured by an instrument known as an "angular" accelerometer; this instrument being designed to measure angular or twisting movements, rather than linear movements of the vehicle. Frequently, separate angular accelerometers are used to measure roll, pitch, and yaw.

In the past, instruments for inertial navigation depended primarily upon a gyroscope that acted as the inertial mass. While this approach was quite satisfactory in many respects, it had inherent disadvantages. One of these disadvantages was due to the fact that the rotating gyroscope needed extremely precise bearings, otherwise the friction would impair the operation of the instrument. Unfortunately, mechanical bearings tend to be weak and sensitive, and also tend to limit the amount of force that could be applied without disrupting the operation of the instrument. Another disadvantage was that the mechanical bearings, however good, tended to wear. This wear, of course, limited the useful life of the instrument.

*Objects and Drawings*

It is therefore the principal object of the invention to provide an improved angular accelerometer that is not sensitive to linear movements of the vehicle.

The attainment of this object and others will be realized from the following specification, taken in conjunction with the drawings of which:

FIGURE 1 is an exploded view of our device;

FIGURE 2 is a top cross-sectional view taken along line 2 of FIGURE 1;

FIGURE 3 is a fragmentary cross-section of the sensitive element and balance-adjusting taken along line 3—3 of FIGURE 2;

FIGURE 4 is a cross-sectional view of a built-in screw driver, taken along line 4 of FIGURE 3; and FIGURE 5 is a cross-sectional view taken along line 5—5 of FIGURE 2.

*Description of the Invention*

Broadly speaking, our angular accelerometer, as shown in the exploded-view type presentation of FIGURE 1, comprises three parts; a cover 10, a base 14, and a "sensitive element" 12. Sensitive element 12 comprises, a roughly doughnut-shaped mass of material that is precisely balanced and is free to rotate about its central axis of rotation. It will be more fully described later.

Base 14 is affixed to the vehicle, and comprises a central shaft 16 about which sensitive element 12 rotates. A pump, not shown, forces a Newtonian liquid upwards through the hollow shaft 16, and out of vents such as 18; the term Newtonian indicating that the fluid's viscosity remains constant despite its flow velocity. The liquid that passes out of vents 18 forms a "cushion" between the shaft 16 and the inner surface of axial bore 19 of the sensitive element 12. This liquid cushion acts as a self-centering bearing, and permits sensitive element 12 to rotate about shaft 16, without metal-to-metal contact between the shaft and the sensitive element.

The fluid bearing replaces prior-art mechanical bearings, and—since there is no metal-to-metal contact or wear—permits a long-lived instrument.

Our accelerometer is of such construction, that the fluid that forms the bearings is also circulated through a chamber in which sensitive element 12, is floated.

In a manner to be described later, the sensitive element 12 is formed in such a way that it has the same specific gravity as the fluid; and it therefore floats neutrally in the fluid—that is, without rising, falling or tipping over. As a result, the fluid and sensitive element 12 form a combination of the same weight, so that linear acceleration causes the entire assembly to move as a unit. In this way sensitive element 12 is prevented from touching shaft 16 under linear acceleration, or being rotated by linear accelerations.

However, under angular accelerations, sensitive element 12 is free to rotate around shaft 16.

In operation, angular accelerations cause base 14, which is attached to the vehicle, to rotate relative to sensitive element 12, which tends to remain fixedly positioned due to its inertia. However, for clarity and ease of explanation, the following explanation may at times be presented as though the sensitive element rotated around the shaft 16 of the base.

In order to sense the rotation, pickup coils such as 20, are fastened to sensitive element 12. Two pickup coils 20 are used, and are positioned diametrically opposite each other on sensitive element 12 in order to provide symmetry and balance. The pickup coils 20 are normally positioned adjacent the poles of magnets such as 22, preferably A.C. electromagnets, which are fixedly positioned on base 14.

Thus, when angular acceleration of the vehicle occurs, base 14 rotates relative to sensitive element 12, and the movement of the A.C. magnets 22 relative to the pickup coils 20 produces an output signal in pickup coils 20. The two pickup coils are series-connected in such a way that signals—if any—resulting from linear acceleration are cancelled; whereas signals from angular accelerations are added together. The resultant output signal is applied to suitable utilization devices.

If base 14 were permitted to rotate an appreciable amount, the pickup coils 20 would move out of the field of the A.C. magnets 22, and would become either insensitive or completely inoperative.

In order to prevent this, a "torquer" coil such as 24, is positioned on sensitive element 12, so that it may restore the original spatial relation between base 14 and sensitive element 12. To achieve this result, the pickup signal produced by pickup coils 20 is acted upon in such a manner that it causes a current to flow through torquer coil 24; the magnetism produced by torquer coil 24 reacting with a torquer magnet 26, which may be a permanent magnet fixed to base 14. The magnetic coupling between torquer coil 24 and torquer magnet 26 produces an oppositely-directed twisting action, or "torque," that causes sensitive element 12 to rotate back to its original position.

In actuality, the slightest rotation of base 14 produces a restoring torque; so that the original rotation is immediately "nulled." In this way the spatial relation between the pickup coils 20 and the magnets 22 is instantly restored to its original condition, so that the pickup coils are always properly located; while the output signal indicates the direction and magnitude of the angular acceleration.

For reasons to be discussed later, a secondary torquer coil 28 and a co-acting torquer magnet (not shown) are positioned on the sensitive element and the base respectively.

It will be noted that in our device, there is no magnet or magnetic materials on the sensitive element 12. We have found that if a magnet were positioned on the sensitive element 12, this element would tend to act like a compass; and its compass-like tendency to turn toward the north produces undesirable results.

In recapitulation, an angular rotation of the vehicle causes relative rotation between sensitive element 12 and base 14. The angular displacement is sensed by pickup coils 20, which produce an output signal. This energizes torquer coil 24 in such a manner that the sensitive element is restored to its original position.

In this way the magnitude and direction of the output signal provides an indication and measure of the angular movement of the vehicle; and the sensitive element 12 is always in a location where it is sensitive to any subsequent angular movements of the vehicle.

It had previously been indicated that sensitive element 12 is designed to rotate about shaft 16; and that the operation will depend upon the inertia of sensitive element 12.

It is well known that the rotational inertia is determined by the distribution of the weight of the sensitive element 12. In other words, if more inertia is desired, the weight should be at the outer periphery; whereas if less angular inertia is desired, the weight should be closer to the center of sensitive element 12. This explains why the sensitive element is doughnut-shaped.

In order to adjust the mass balance and buoyancy balance of the sensitive element 12, we use two weight-distributing controls; namely, a coarse adjustment, and a fine adjustment. The cross-sectional view of FIGURE 2 shows the coarse adjustment, and the fragmentary cross-sectional view of FIGURE 3 shows both the coarse and the fine adjustments.

The coarse adjustment comprises four threaded holes, 32 (only one being shown in FIGURE 3) that are directed radially from the periphery toward the axial bore of sensitive element 12. Weights in the form of threaded screws 34, are positioned in threaded radial holes 32. By turning the threaded weights 34, they are moved toward or away from the periphery of the sensitive element 12.

Four such coarse adjustments are provided, these being 90° apart, so that sensitive element 12 may be precisely mass-balanced and buoyancy-balanced.

In order to provide a fine adjustment, another type of threaded hole is used, this also being shown in FIGURE 3. The fine adjustment comprises a threaded hole 40 that is angled slightly outwardly and upwardly in sensitive element 12. As shown, turning the threaded screw 42 causes it to vary—to a slight extent depending on the angle—its distance from the center of the sensitive element 12; in this way providing a fine adjustment of the radial position of the weight 42. Two fine adjustments are provided, these again being 90° apart in order to provide even more precise balancing.

In order to adjust the position of the fine adjusting screw 42, we use an adjusting screw driver, 44 (shown in FIGURES 3 and 4), which is required because the sensitive element 12 is in a hermetically-sealed oil-filled chamber. As shown in FIGURES 3 and 4, our arrangement uses a screw driver 44 that is ordinarily disengaged from the fine-adjustment-screw 42, by means such as a spring or a retracting locking nut. When an adjustment is necessary, screw driver 44 is advanced by means to later be described, until its slotted end 46 engages the tongue 47 of fine-adjustment-screw 42. Turning the screw driver 44 then advances or retracts the fine-adjustment-screw 42; thus adjusting the balance as previously described.

An O-ring 49 permits rotational and axial movement of screw driver 44, and still provides a leak-proof arrangement.

The other end of screw driver 44 comprises a slot 52 and a threaded hole 48, which is best shown in FIGURE 4.

In order to actuate screw driver 44, we use an adjusting tool 50, which comprises an outer cylindrical member 54 that terminates in a tongue 56 that is proportioned to fit into slot 52 of screw driver 44. The outer cylinder of adjusting tool 50 also has a flange-like, knurled handle 58 that is unitary with the cylindrical portion 54.

Adjusting tool 50 has an axially positioned rod 60 that is free to rotate in the tool. One end of rod 60 terminates in a threaded portion 62 that is adapted to mate with the threaded hole 48 of screw driver 44. The other end of axially positioned rod 60 terminates in a second knurled handle 64, which may be rotated, and thus cause the threaded portion 62 to rotate.

In use, the threaded end 62 is positioned in the threaded hole 48, and knurled handle 64 is rotated, while knurled handle 58 is held stationary. This action axially engages the screw driver by gradually inserting tongue 56 into slot 52. The engagement of the tongue and slot assures that the adjusting tool can positively rotate the screw driver 44. Slight axial pressure causes the screw driver 44 to move forward, as may be understood from FIGURE 3, until its slotted end 46 engages the tongue 47 of fine adjustment weight 42.

In this way, the balance of the sensing element 12 may be very precisely adjusted from outside the hermetically-sealed leak-proof chamber.

It is frequently necessary, while the vehicle is at rest, to test the various instruments associated with a vehicle. To achieve this result, a second torquer coil 28 of FIGURE 1, known as a "test torquer" coil, is positioned diametrically opposite torque coil 24. In order to test the instrument, a predetermined excitation is applied to the test torquer coil 28; and this excitation co-acts with a torquer magnet (not shown), and causes sensitive element 12 to rotate a bit, just as though the vehicle were executing an angular turn. The pickup coils 20 therefore produce an output signal which is used to energize torquer coil 24, which now causes the sensitive element to return to its original position. Since the various values are known, it is thus possible to test the instrument even while the vehicle is standing still.

It is of course necessary that wires be connected to the pickup coils 20 and the torquer coils 24 and 28, in order for electric current to flow through them, and to be applied to a utilization device. A plurality of wires is of course necessary, depending upon the number of connections to the various pickup and torquer elements.

In the past, radially-positioned "crinkle" wires were used; one end being attached to the frame of the instrument, while the other end was attached to the sensitive element 12. We have found that the crinkle wires tend to impede the rotation of sensitive element 12; and therefore introduce an appreciable error, despite the fact that the crinkle wires are as small as it is possible to make them.

Our invention dispenses with these prior-art crinkle wires, and uses instead, thin gold plated copper wires having a diameter of approximately one one-thousandth of an inch. As shown in FIGURE 5, these wires 74 are connected between the terminal board portion 76 of the accelerometer and the wire terminations of sensitive element 12, and extend parallel to the axis of rotation.

We have found that the use of these very fine wires positioned parallel to and surrounding the axis of rotation of the sensitive element 12, produces a very minimal resistance to the rotation of the sensitive element 12; and yet permits the flow of electricity to and from the electrical components mounted on sensitive element 12.

*Advantages*

It may now be realized that our invention has innumerable advantages over prior-art devices. Firstly, our sensitive element is completely floated in a liquid having approximately the same specific gravity as the sensitive element. This assures that the sensitive element will not move when exposed to linear acceleration, but is free to rotate when exposed to angular acceleration. Secondly, our accelerometer uses a fluid bearing that is far superior to the mechanical bearings previously used. Thirdly, our sensitive element is floated in such a way that it neither rises, descends, nor tips over in the fluid in which it is floating. Fourthly our sensitive element has a coarse and a fine adjustment to control its balance. Fifthly the lead wires connected to the electrical components on the sensitive element are of a novel type that are parallel to the shaft of rotation, and offer minimal resistance to the rotation of the sensitive element. Sixthly our invention comprises a novel means for making fine adjustments in the balance of the sensitive element. And finally, our instrument has been shown to withstand far greater accelerations than prior-art instruments; and still produce output signals that indicate the amount and direction of the angular acceleration of the vehicle.

Although the invention has been described and illustrated in detail, it is to be understood that the same is by way of illustration and example only and is not to be taken by way of limitation, the spirit and scope of this invention being limited only by the terms of the appended claims.

We claim:
1. An angular accelerometer comprising:
a disc-like sensitive element having an axial bore;
a base having a shaft positioned in said bore—whereby said sensitive element may rotate relative to said base;
fluid-bearing means for preventing contact between said sensitive element and said shaft;
a pickup device mounted on said sensitive element;
magnetic-field-producing means mounted on said base adjacent said pickup device—whereby when angular acceleration causes relative rotation between said sensitive element and said base, said magnetic field induces in said pickup device an output signal indicative of said acceleration;
a torquer coil mounted on said sensitive element;
second magnetic-field-producing means mounted on said base adjacent said torquer coil—whereby the signal from said pickup device may be applied to said torquer coil to cause said torquer coil and associated magnetic field to null the rotational effect produced by said angular acceleration;
a coarse weight-distribution control comprising a threaded radial hole in said member and a first threaded weight positioned in said radial hole—whereby said first weight may be radially positioned in said radial hole to provide a coarse weight-distribution control;
a fine weight-distribution control comprising a threaded hole in said member, said threaded hole being positioned at an acute angle relative to the axis of rotation of said sensitive element, and second threaded weight positioned in said angled hole—whereby said second weight may be positioned in said angled hole to provide a fine weight-distribution control; and
means for adjusting the position of said second weight, said means comprising a screw driver having one end adapted to mate with the outer end of said second weight, said screw driver mounted in said base for angular and axial movement.

2. An angular accelerometer comprising:
an annular sensitive element having an axial bore;
a base having a shaft positioned in said bore—whereby said sensitive element may rotate relative to said base;
fluid-bearing means for preventing contact between said sensitive element and said shaft;
a pickup device mounted on said sensitive element;
magnetic-field-producing means mounted on said base adjacent said pickup device—whereby when angular acceleration causes relative rotation between said sensitive element and said base, said magnetic field induces in said pickup device an output signal indicative of said acceleration;
a torquer coil mounted on said sensitive element;
second magnetic-field-producing means mounted on said base adjacent said torquer coil—whereby the signal from said pickup device may be applied to said torquer coil to cause said torquer coil and associated magnetic field to null the rotational effect produced by said angular acceleration;
a coarse weight-distribution control comprising a threaded radial hole in said member and a first threaded weight positioned in said radial hole—whereby said first weight may be radially positioned in said radial hole to provide a coarse weight distribution control;
a fine weight-distribution control comprising a threaded hole in said member, said threaded hole being positioned at an acute angle relative to the axis of rotation of said sensitive element, and a second threaded weight positioned in said angled hole—whereby said second weight may be positioned in said angled hole to provide a fine weight-distribution control;
means for adjusting the position of said second weight, said means comprising a screw driver having one end adapted to mate with one end of said second weight, said screw driver mounted in said base for angular and axial movement; and adjusting-tool means for actuating said screw driver, said adjusting tool comprising means for axially engaging said screw driver, and comprising means for engaging said screw driver for rotational movement.

3. An angular accelerometer comprising:

a doughnut-shaped sensitive element having an axial bore and wire terminations;

a base having a shaft positioned in said bore—whereby said sensitive element may rotate relative to said base;

fluid-bearing means for preventing contact between said sensitive element and said shaft;

a pickup device mounted on said sensitive element;

magnetic-field-producing means mounted on said base adjacent said pickup device—whereby when angular acceleration causes relative rotation between said sensitive element and said base, said magnetic field induces in said pickup device an output signal indicative of said acceleration;

a torquer coil mounted on said sensitive element;

second magnetic-field-producing means mounted on said base adjacent said torquer coil—whereby the signal from said pickup device may be applied to said torquer coil to cause said torquer coil and associated magnetic field to null the rotational effect produced by said angular acceleration;

a coarse weight-distribution control comprising a threaded radial hole in said member and a first threaded weight positioned in said radial hole—whereby said first weight may be radially positioned in said radial hole to provide a coarse weight distribution control;

a fine weight-distribution control comprising a threaded hole in said member, said threaded hole being positioned at an acute angle relative to the axis of rotation of said sensitive element, and a second threaded weight positioned in said angled hole—whereby said second weight may be positioned in said angled hole to provide a fine weight-distribution control;

means for adjusting the position of said second weight, said means comprising a screw driver having one end adapted to mate with one end of said second weight, said screw driver mounted in said base for angular and axial movement;

adjusting-tool means for actuating said screw driver, said adjusting tool comprising means for axially engaging said screw driver, and comprising means for engaging said screw driver for rotational movement;

a terminal board mounted on said accelerometer; and a plurality of thin gold-plated copper wires connected between said terminal board and the wire terminations of said sensitive element, said wires being positioned parallel to and surrounding said shaft.

4. A combination for an angular accelerometer having a base, comprising:

a doughnut-shaped sensitive element having an axial bore;

a coarse weight-distribution control comprising a threaded radial hole and a first threaded weight positioned in said radial hole—whereby said first weight may be radially positioned in said radial hole to provide a coarse weight-distribution control;

a fine weight-distribution control comprising a threaded hole, said threaded hole being positioned at an acute angle relative to the axis of rotation of said sensitive element, and second threaded weight positioned in said angled hole—whereby said second weight may be positioned in said angled hole to provide a fine weight-distribution control; and means for adjusting the position of said second weight, said means comprising a screw driver having one end adapted to mate with one end of said second weight, said screw driver being mounted for angular and axial movement in said base.

5. A combination for an angular accelerometer having a base, comprising:

a doughnut-shaped member having an axial bore;

a coarse weight-distribution control comprising a threaded radial hole and a first threaded weight positioned in said radial hole—whereby said first weight may be radially positioned in said radial hole to provide a coarse weight distribution control;

a fine weight-distribution control comprising a threaded hole, said threaded hole being positioned at an acute angle relative to the axis of rotation of said sensitive element, and a second threaded weight positioned in said angled hole—whereby said second weight may be positioned in said angled hole to provide a fine weight-distribution control;

means for adjusting the position of said second weight, said means comprising a screw driver having one end adapted to mate with one end of said second weight, said screw driver mounted in said base for angular and axial movement; and adjusting-tool means for actuating said screw driver, said adjusting tool comprising means for axially engaging said screw driver, and comprising means for engaging said screw driver for rotational movement.

6. An angular accelerometer comprising:

a circularly symmetrical inertia element having an axial bore;

a base having a shaft positioned in said bore to allow said inertia element to rotate relative to said base;

fluid-bearing means for preventing contact between said inertia element and said shaft;

a pickup device mounted on said inertia element;

magnetic-field-producing means mounted on said base adjacent said pickup device so that when said base is angularly accelerated about the axis of said shaft, tending to cause relative rotation between said inertia element and said base, said magnetic field induces in said pickup device an output signal indicative of said angular acceleration;

a torquer coil, connected to be responsive to signals from said pickup device, mounted on said inertia element;

second magnetic-field-producing means mounted on said base adjacent said torquer coil to interact with the field of said torquer coil to cause said inertia element to follow said base;

a coarse weight-distribution control having a threaded radial hole formed in said inertia element and a first threaded weight positioned in said radial hole;

a fine weight-distribution control including a threaded hole in said inertia element, said threaded hole having an axial component relative to the axis of rotation of said inertia element, and a second threaded weight positioned in said last named hole;

means for adjusting the position of said second weight, including a screwdriver having one end adapted to mate with the outer end of said second weight, said screwdriver mounted in said base for angular and axial movement.

7. An angular accelerometer comprising:

an annular inertia element having an axial bore along the axis of symmetry of said element;

a base having a shaft positioned in said bore to allow said inertia element to rotate relative to said base;

fluid-bearing means for preventing contact between said inertia element and said shaft;

a pickup device mounted on said inertia element;

magnetic-field-producing means mounted on said base adjacent said pickup device to sense relative rotation between said inertia element and said base;

a torquer coil mounted on said inertia element, and connected to be responsive to signals from said pickup device;

second magnetic-field-producing means mounted on said base adjacent to said torquer coil and coupling with said torquer coil to cause said inertia member to follow said base;

a coarse weight-distribution control including a threaded radial hole in said inertia member and a first threaded weight positioned in said radial hole;

a fine weight-distribution control including a second threaded hole in said inertia member angled in a direction to have direction components both parallel and perpendicular to the axis of rotation of said inertia element, and a second threaded weight positioned in said angled hole;

means for adjusting the position of said second weight, including a screwdriver having one end adapted to mate with one end of said second weight, said screwdriver mounted in said base for angular and axial movement; and adjusting tool means for actuating said screwdriver, including means for axially engaging said screwdriver and means for engaging said screwdriver for rotational movement.

8. An angular accelerometer comprising:
a circularly symmetrical inertia element having an axial bore along its axis of symmetry and having wire terminations;
a base having a shaft positioned in said bore to allow said inertia element to rotate relative to said base;
fluid-bearing means for preventing contact between said inertia element and said shaft;
a pickup device mounted on said inertia element;
magnetic-field-producing means mounted on said base adjacent said pickup device to cause said pickup device to sense relative rotation between said inertia element and said base;
a torquer coil, connected to be responsive to signals from said pickup device, mounted on said inertia element;
second magnetic-field-producing means mounted on said base adjacent to said torquer coil and magnetically coupled thereto to cause said inertia element to follow said base;
a coarse-weight distribution control including a threaded radial hole in said inertia member and a first threaded weight positioned in said radial hole;
a fine weight-distribution control including a second threaded hole in said inertia member, said second hole being angled to have direction components both perpendicular and parallel to the axis of rotation of said inertia element, and a second threaded weight positioned in said angled hole;
means for adjusting the position of said second weight, including a screwdriver having one end adapted to mate with one end of said second weight, said screwdriver mounted in said base for angular and axial movement;
adjusting-tool means for actuating said screwdriver, said adjusting tool means including means for axially engaging said screwdriver and means for engaging said screwdriver for rotational movement;
a terminal board mounted on said base; and
a plurality of thin gold-plated copper wires connected between said terminal board and the wire terminations of said inertia element, said wires being positioned parallel to and surrounding said shaft.

9. In combination:
a circularly symmetrical inertia element having an axial bore along its axis of symmetry;
a coarse weight-distribution control including a threaded radial hole in said inertia member and a first threaded weight positioned in said radial hole;
a fine weight-distribution control including a second threaded hole in said inertia member, said second threaded hole having direction components both parallel and perpendicular to said axis of symmetry, and a second threaded weight positioned in said second hole; and
means for adjusting the position of said second weight, said means including a screwdriver having one end adapted to mate with one end of said second weight, said screwdriver mounted for angular and axial movement in said base.

10. In combination:
a circularly symmetrical inertia member having an axial bore along its axis of symmetry;
a coarse weight-distribution control including a threaded radial hole in said inertia member and a first threaded weight positioned in said radial hole;
a fine weight-distribution control including a second threaded hole in said inertia member, said second hole having direction components both parallel and perpendicular to said axis of symmetry; and a second threaded weight positioned in said second hole;
means for adjusting the position of said second weight, said means including a screwdriver having one end adapted to mate with one end of said second weight, said screwdriver mounted in said base for angular and axial movement; and
adjusting tool means for actuating said screwdriver, said adjusting tool including means for axially engaging said screwdriver, and means for engaging said screwdriver for rotational movement.

References Cited in the file of this patent
UNITED STATES PATENTS

| | | |
|---|---|---|
| 2,182,394 | Bucy | Dec. 5, 1939 |
| 2,809,029 | Christoph | Oct. 8, 1957 |
| 2,882,034 | Wuerth | Apr. 14, 1959 |
| 2,923,904 | Hieber | Feb. 2, 1960 |
| 2,942,476 | Turner | June 28, 1960 |
| 2,957,366 | Driver | Oct. 25, 1960 |
| 2,986,941 | Horath | June 6, 1961 |
| 3,005,350 | Barth | Oct. 24, 1961 |
| 3,018,142 | Warnock | Jan. 23, 1962 |
| 3,071,008 | Steele | Jan. 1, 1963 |

FOREIGN PATENTS

| | | |
|---|---|---|
| 713,550 | Great Britain | Aug. 11, 1954 |
| 773,582 | Great Britain | May 1, 1957 |